(12) United States Patent
Tong et al.

(10) Patent No.: US 10,091,800 B2
(45) Date of Patent: Oct. 2, 2018

(54) USER TERMINAL, BASE STATION, AND PROCESSOR

(71) Applicant: KYOCERA CORPORATION, Kyoto (JP)

(72) Inventors: Fangwei Tong, Machida (JP); Chiharu Yamazaki, Tokyo (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 52 days.

(21) Appl. No.: 15/168,705

(22) Filed: May 31, 2016

(65) Prior Publication Data

US 2016/0278108 A1 Sep. 22, 2016

Related U.S. Application Data

(63) Continuation of application No. PCT/JP2014/080890, filed on Nov. 21, 2014.

(30) Foreign Application Priority Data

Dec. 3, 2013 (JP) .................................. 2013-249795

(51) Int. Cl.
*H04W 72/08* (2009.01)
*H04W 72/12* (2009.01)
(Continued)

(52) U.S. Cl.
CPC ........... *H04W 72/085* (2013.01); *H04L 1/003* (2013.01); *H04L 1/0026* (2013.01); *H04L 5/0057* (2013.01); *H04L 27/34* (2013.01); *H04W 24/10* (2013.01); *H04W 72/042* (2013.01); *H04W 72/12* (2013.01); *H04L 1/001* (2013.01); *H04L 1/0003* (2013.01); *H04L 1/0009* (2013.01); *H04L 1/0031* (2013.01);
(Continued)

(58) Field of Classification Search
None
See application file for complete search history.

(56) References Cited

U.S. PATENT DOCUMENTS

2009/0073922 A1* 3/2009 Malladi ................. H04L 1/0004
370/328
2010/0093287 A1 4/2010 Higuchi et al.
(Continued)

FOREIGN PATENT DOCUMENTS

| JP | 2008-236431 A | 10/2008 |
|---|---|---|
| JP | 2013-135247 A | 7/2013 |

OTHER PUBLICATIONS

International Search Report issued in PCT/JP2014/080890; dated Feb. 24, 2015.
(Continued)

*Primary Examiner* — Kodzovi Acolatse
(74) *Attorney, Agent, or Firm* — Studebaker & Brackett PC

(57) ABSTRACT

A user terminal comprises a controller configured to measure a state on a downlink channel; transmitter configured to transmit, to a base station, channel state information on the state; and a receiver configured to receive, from the base station, control information on an uplink channel state measured by the base station. The controller is configured to adaptively modify, on the basis of the control information, the number of bits of the channel state information.

9 Claims, 7 Drawing Sheets

(51) Int. Cl.
| | |
|---|---|
| *H04L 5/00* | (2006.01) |
| *H04L 27/34* | (2006.01) |
| *H04W 24/10* | (2009.01) |
| *H04W 72/04* | (2009.01) |
| *H04L 1/00* | (2006.01) |
| *H04W 88/02* | (2009.01) |
| *H04W 88/08* | (2009.01) |

(52) U.S. Cl.
CPC .......... *H04L 5/0007* (2013.01); *H04W 88/02* (2013.01); *H04W 88/08* (2013.01)

(56) References Cited

U.S. PATENT DOCUMENTS

| | | | | |
|---|---|---|---|---|
| 2013/0083737 A1* | 4/2013 | Earnshaw | ............ | H04L 1/1887 370/329 |
| 2013/0322413 A1* | 12/2013 | Pelletier | ............ | H04W 72/1289 370/336 |
| 2015/0110029 A1* | 4/2015 | Hwang | ................ | H04L 1/0026 370/329 |

OTHER PUBLICATIONS

Written Opinion issued in PCT/JP2014/080890; dated Feb. 24, 2015.
3rd Generation Partnership Project; Technical Specification Group Radio Access Network; Evolved Universal Terrestrial Radio Access (E-UTRA); Physical layer procedures; 3GPP TS 36.213 V11.4.0; Sep. 2013; pp. 1-182; Release 11; 3GPP Organizational Partners.

\* cited by examiner

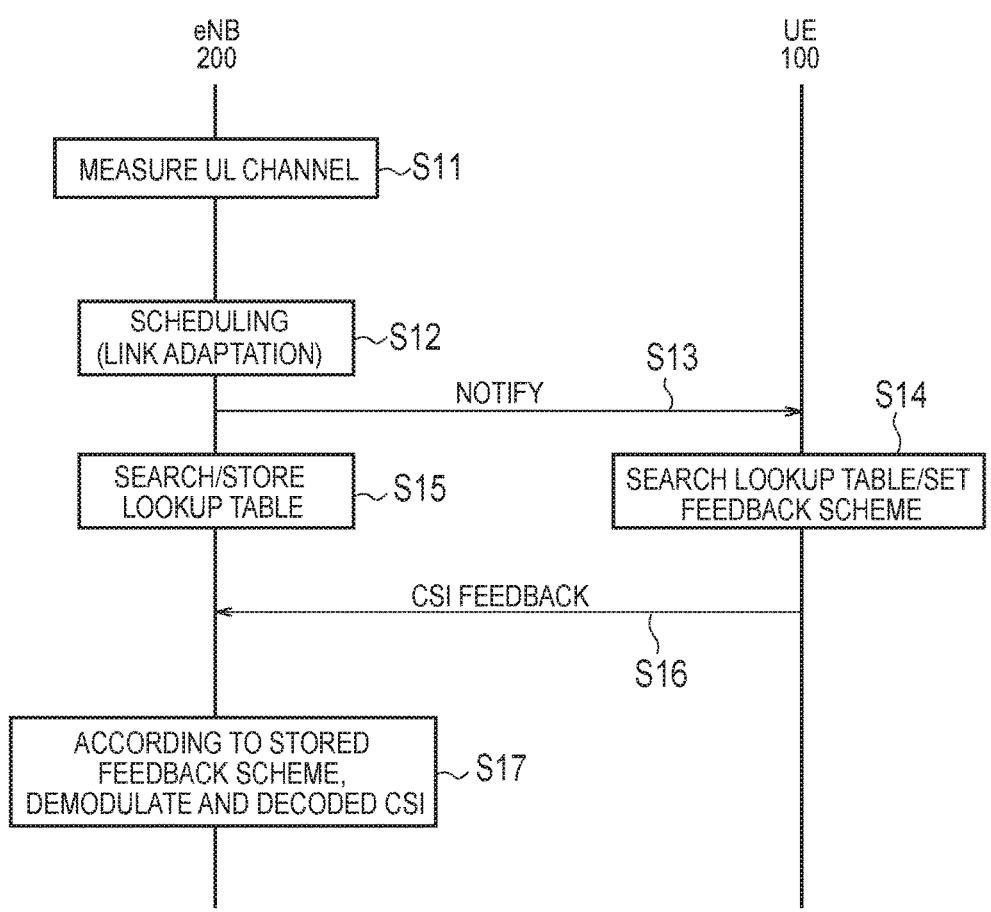

FIG. 7

PUSCH-USE MCS TABLE      CSI-USE TABLE

| NO. | LINK ADAPTATION | CSI FEEDBACK SCHEME |
|---|---|---|
| 0 | QPSK-CHANNEL CODING1 | QPSK-CHANNEL CODING 1' - CSI BIT NUMBER = 1 |
| 1 | 16QAM-CHANNEL CODING2 | 16QAM-CHANNEL CODING 2' - CSI BIT NUMBER = 2 |
| 2 | 64QAM-CHANNEL CODING3 | 64QAM-CHANNEL CODING 3' - CSI BIT NUMBER = 3 |
| 3 | ... | ... |

FIG. 8

PUSCH-USE MCS TABLE      CSI-USE TABLE

| NO. | LINK ADAPTATION | CSI FEEDBACK SCHEME |
|---|---|---|
| 0 | QPSK-CHANNEL CODING1 | CHANNEL CODING 1' - CSI BIT NUMBER = 1 |
| 1 | 16QAM-CHANNEL CODING2 | CHANNEL CODING 2' - CSI BIT NUMBER = 2 |
| 2 | 64QAM-CHANNEL CODING3 | CHANNEL CODING 3' - CSI BIT NUMBER = 3 |
| 3 | ... | ... |

FIG. 9

PUSCH-USE MCS TABLE · CSI-USE TABLE

| NO. | LINK ADAPTATION | CSI FEEDBACK SCHEME |
|---|---|---|
| 0 | QPSK-CHANNEL CODING1 | CSI BIT NUMBER = 1 |
| 1 | 16QAM-CHANNEL CODING2 | CSI BIT NUMBER = 2 |
| 2 | 64QAM-CHANNEL CODING3 | CSI BIT NUMBER = 3 |
| 3 | ... | ... |

FIG. 10

PUSCH-USE MCS TABLE · CSI-USE TABLE

| NO. | LINK ADAPTATION | CSI FEEDBACK SCHEME |
|---|---|---|
| 0 | QPSK-CHANNEL CODING1 | QPSK-CHANNEL CODING 1' - CSI BIT NUMBER UPPER LIMIT = 1 |
| 1 | 16QAM-CHANNEL CODING2 | 16QAM-CHANNEL CODING 2' - CSI BIT NUMBER UPPER LIMIT = 2 |
| 2 | 64QAM-CHANNEL CODING3 | 64QAM-CHANNEL CODING 3' - CSI BIT NUMBER UPPER LIMIT = 3 |
| 3 | ... | ... |

1 OR 2 BIT(S)
EACH ELEMENT INDICATES MODULATION SCHEME OF 1 UE
-IN A CASE OF 1 BIT, 2 PATTERNS OF MODULATION SCHEMES ARE SWITCHABLE
- IN A CASE OF 2 BITS, 4 PATTERNS OF MODULATION SCHEMES ARE SWITCHABLE

USER TERMINAL, BASE STATION, AND PROCESSOR

TECHNICAL FIELD

The present invention relates to a user terminal, a base station, and a processor.

BACKGROUND ART

LTE (Long Term Evolution), specifications of which have been designed in 3GPP (3rd Generation Partnership Project) which is a project aiming to standardize a mobile communication system, supports Frequency Division Duplex (FDD) in which communication is performed by using a downlink frequency and an uplink frequency.

In such a mobile communication system, a user terminal feeds back, to a base station, channel state information (CSI) corresponding to a channel state in the downlink frequency on the basis of a downlink reference signal that is transmitted from the base station by using the downlink frequency (for example, see Non Patent Literature 1).

The base station performs downlink transmission control on the basis of the CSI fed back from the user terminal. The downlink transmission control is downlink multi-antenna transmission control, for example.

In order to realize sophistication of the downlink transmission control as described above, more highly accurate CSI is needed.

However, there is a problem in that in the current specifications, the number of bits in channel state information is fixedly set, and thus, it is not possible to feed back more highly accurate CSI.

CITATION LIST

Non Patent Literature

[NPL 1] 3GPP Technical Specification "TS 36.213 V11.4.0" September, 2013

SUMMARY OF INVENTION

A user terminal according to a first aspect comprises: a controller configured to measure a state on a downlink channel; a transmitter configured to transmit, to a base station, channel state information on the state; and a receiver configured to receive, from the base station, control information on an uplink channel state measured by the base station. The controller is configured to adaptively modify, on the basis of the control information, the number of bits of the channel state information.

A base station according to a second aspect comprises: a receiver configured to receive, from a user terminal, channel state information on a downlink channel state measured by the user terminal; a controller configured to measure a state on an uplink channel; and transmitter configured to transmit, to the user terminal, control information on the state. The number of bits of the channel state information is adaptively modified according to the control information.

An apparatus according to a third aspect is an apparatus to be provided in a user terminal. The apparatus comprises a processor and a memory. The processor is configured to perform the processing of: measuring a state on a downlink channel; receiving, from the base station, control information on an uplink channel state measured by the base station; adaptively modifying the number of bits of channel state information on the state, on the basis of the control information, and transmitting, to the base station, the channel state information.

BRIEF DESCRIPTION OF DRAWINGS

FIG. 6 is an operation sequence chart about a CSI feedback according to the embodiment.

FIG. 7 is a table for describing a configuration example 1 of a CSI-use table according to the embodiment.

FIG. 8 is a table for describing a configuration example 2 of the CSI-use table according to the embodiment.

FIG. 9 is a table for describing a configuration example 3 of the CSI-use table according to the embodiment.

FIG. 10 is a table for describing a configuration example 4 of the CSI-use table according to the embodiment.

DESCRIPTION OF EMBODIMENTS

[Overview of Embodiments]

Figure 1:
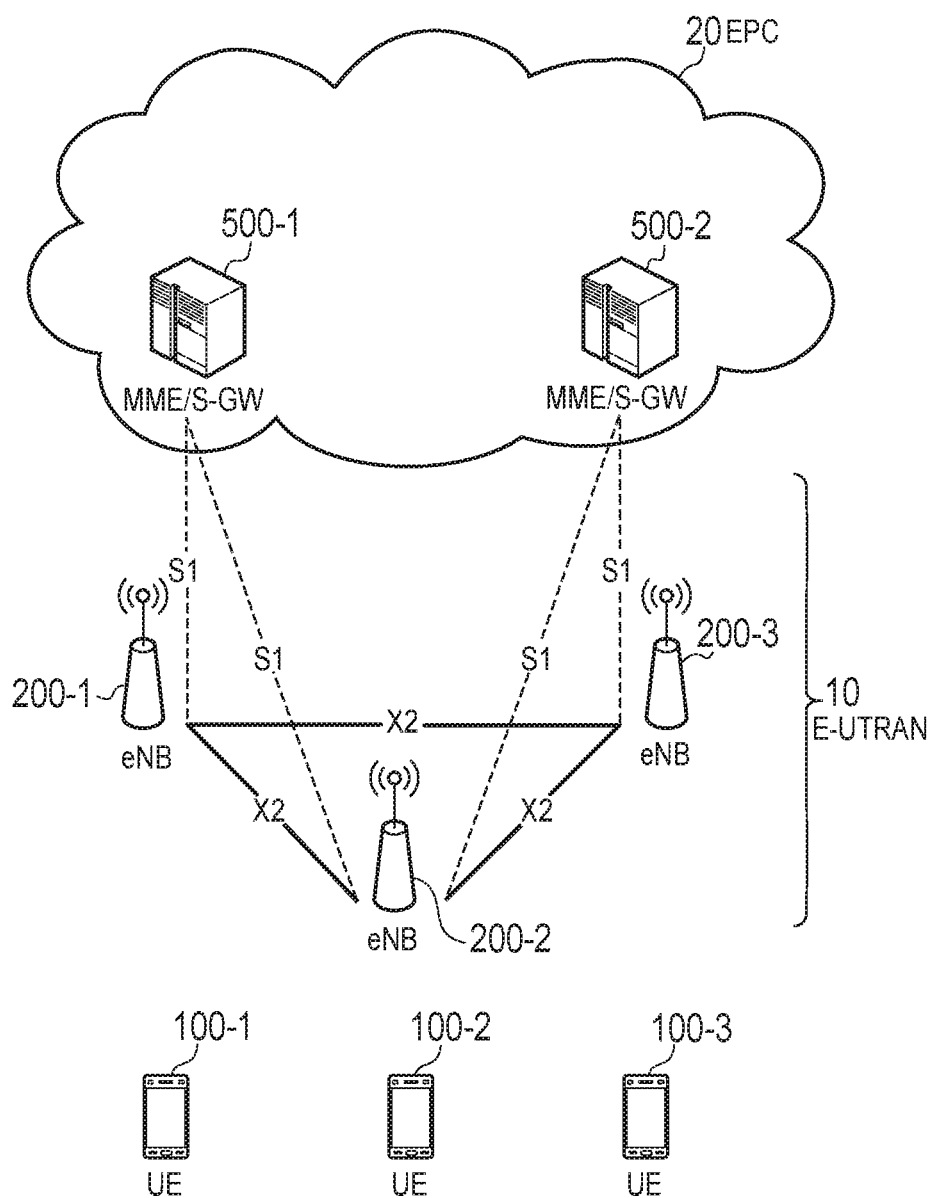
FIG. 1 is a configuration diagram of an LTE system according to an embodiment.

A user terminal according to an embodiment is used in a mobile communication system. The user terminal comprises: a transmitter configured to transmit, to a base station, channel state information on a downlink channel state measured by the user terminal; a receiver configured to receive, from the base station, control information on an uplink channel state measured by the base station; and a controller configured to adaptively modify, on the basis of the control information, the number of bits of the channel state information.

In the embodiment, the controller adaptively modifies, on the basis of the control information, the number of bits of the channel state information, and adaptively modifies a coding scheme applied to the channel state information.

In the embodiment, the controller adaptively modifies, on the basis of the control information, the number of bits of the channel state information, and adaptively modifies a modulation scheme applied to the channel state information.

In the embodiment, the control information is information indicating a modulation and coding scheme (MCS) to be applied to an uplink data channel.

In a first modification of the embodiment, when the channel state information is transmitted on an uplink control channel, the control information is information indicating a modulation scheme and/or a coding scheme to be applied to the channel state information transmitted on the uplink control channel.

In a second modification of the embodiment, when the channel state information is transmitted on an uplink control channel, the control information is information indicating a format to be applied to the uplink control channel.

A base station according to the embodiment is used in a mobile communication system. The base station comprises: a receiver configured to receive, from a user terminal, channel state information on a downlink channel state measured by the user terminal; and a transmitter configured to transmit, to the user terminal, control information on an uplink channel state measured by the base station. The number of bits of the channel state information is adaptively modified according to the control information.

In the embodiment, according to the control information, the number of bits of the channel state information is adaptively modified and a coding scheme applied to the channel state information is adaptively modified.

In the embodiment, according to the control information, the number of bits of the channel state information is adaptively modified and a modulation scheme applied to the channel state information is adaptively modified.

In the embodiment, the control information is information indicating a modulation and coding scheme (MCS) to be applied to an uplink data channel.

In the first modification of the embodiment, when the channel state information is transmitted on an uplink control channel, the control information is information indicating a modulation scheme and/or a coding scheme to be applied to the channel state information transmitted on the uplink control channel.

In the second modification of the embodiment, when the channel state information is transmitted on an uplink control channel, the control information is information indicating a format to be applied to the uplink control channel.

A method according to the embodiments is in a mobile communication system in which channel state information on a downlink channel state measured by a user terminal is transmitted from the user terminal to a base station. The method comprises the steps of; receiving, by the user terminal, from the base station, control information on an uplink channel state measured by the base station; and adaptively modifying, by the user terminal, the number of bits of the channel state information, on the basis of the control information.

[Embodiment]

Hereinafter, an embodiment in which the present invention is applied to an LTE system will be described.

(System Configuration)

FIG. 1 is a configuration diagram of an LTE system according to a first embodiment. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface.

Figure 2:
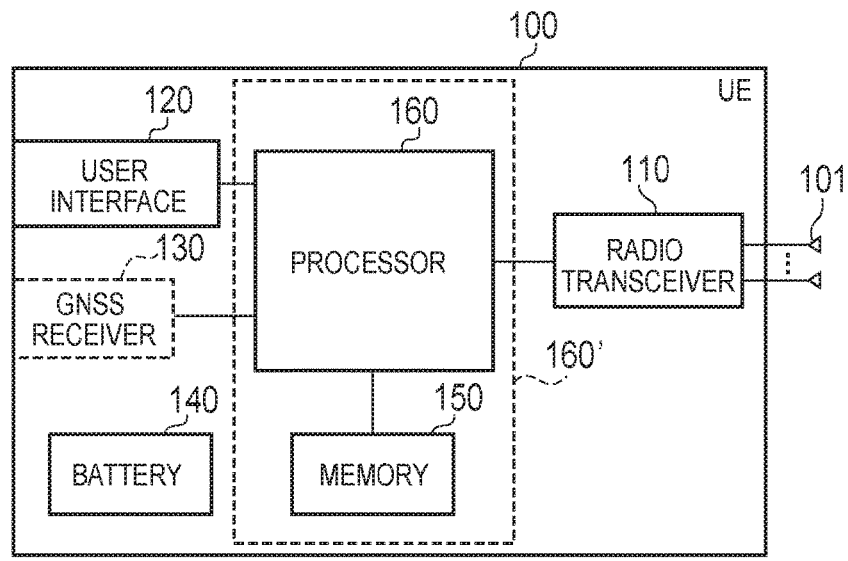
FIG. 2 is a block diagram of a UE according to the embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 corresponds to a storage unit. The processor 160 (and the memory 150) constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain UE location information indicating a geographical location (longitude and latitude, etc.) of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
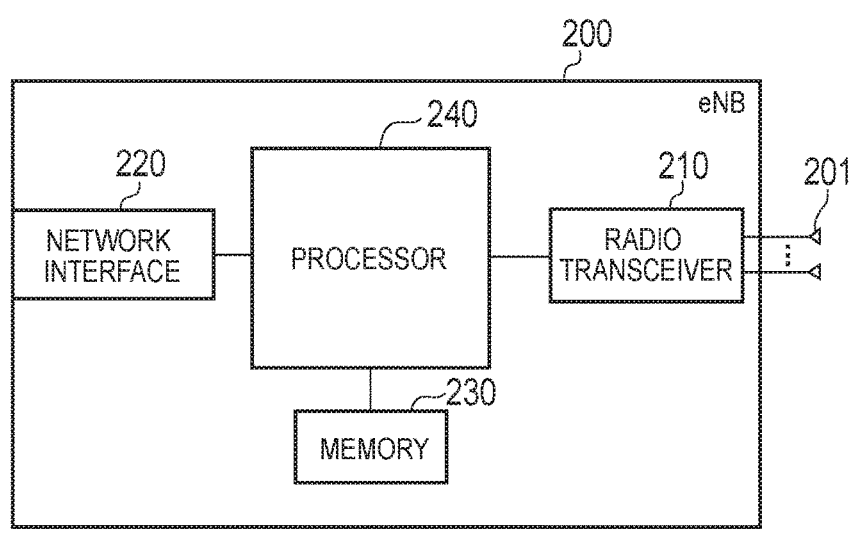
FIG. 3 is a block diagram of an eNB according to the embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 corresponds to a storage unit. The processor 240 (and the memory 230) constitute a controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
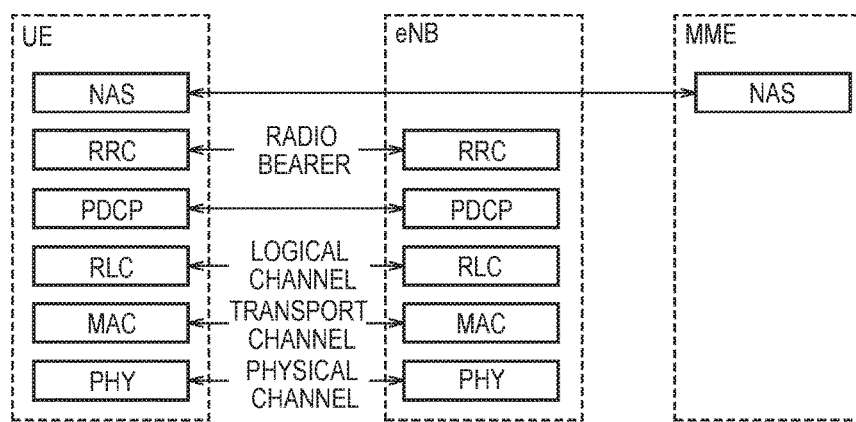
FIG. 4 is a protocol stack diagram of a radio interface according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), otherwise the UE 100 is in an idle state (an RRC idle state).

A NAS (Non-Access Stratum) layer positioned above the RRC layer performs a session management, a mobility management and the like.

Figure 5:
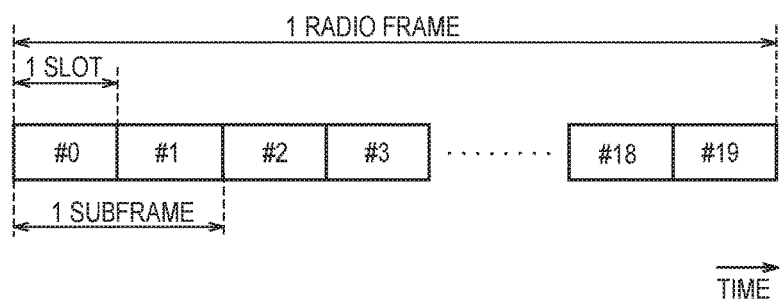
FIG. 5 is a configuration diagram of a radio frame according to the embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively. As a duplex scheme, either an FDD (Frequency Division Duplex) scheme or a TDD (Time Division Duplex) scheme is used. However, in the present embodiment, the FDD scheme is mainly assumed.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. One subcarrier and one symbol constitute one resource element (RE). Among radio resources assigned to the UE 100, a frequency resource can be specified by a RB and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data. Moreover, downlink reference signals such as Cell specific Reference Signal (CRS) are separately disposed in each subframe.

The control information carried by the PDCCH, for example, includes the uplink SI (Scheduling Information), the downlink SI, and a TPC bit. The uplink SI is information indicating the assignment of uplink radio resources, and the downlink SI is information indicating the assignment of downlink radio resources. The TPC bit is information for instructing an increase or decrease in the uplink transmission power. These information is referred to as downlink control information (DCI). The PDSCH carries the control information and/or user data. For example, a downlink data region may be assigned only to the user data, or may be assigned such that the user data and the control information are multiplexed.

In the uplink, both ends in the frequency direction of each subframe are control regions used as a physical uplink control channel (PUCCH) for mainly transmitting a control signal. Furthermore, the other portion of each subframe is a region available as a physical uplink shared channel (PUSCH) for mainly transmitting user data. Further, in a predetermined symbol of each subframe, uplink reference signals such as sounding reference signal (SRS) are disposed.

The control signal sent by the PUCCH includes a CQI (Channel Quality Indicator), a PMI (Precoding Matrix Indicator), an RI (Rank Indicator), an SR (Scheduling Request), an ACK/NACK, for example. The CQI is an index indicating the downlink channel quality and is used for deciding a recommended modulation scheme and a coding rate to be used in downlink transmission, for example. The PMI is an index indicating a precoder matrix that is preferable to be used for the downlink transmission. The RI is an index indicating the number of layers (the number of streams) available for the downlink transmission. The SR is information for requesting the allocation of an uplink radio resource (a resource block). The ACK/NACK is information indicating whether or not a signal transmitted via a downlink physical channel (for example, the PDSCH) has been successfully decoded. The CQI, PMI, and RI correspond to the channel information (CSI; Channel State Information) acquired by the UE 100 by using the downlink reference signal to perform channel estimation and then using a code book. It is noted that the details are described later; in the embodiment, the CSI may be fed back as a direct value instead of the CSI being fed back as an index. The PUSCH carries a control signal and/or user data. For example, an uplink data region may be allocated only to the user data, or allocated such that the user data and the control signal are multiplexed.

(Uplink Control Channel)

The PUCCH corresponds to the uplink control channel. As described above, PUCCH regions are provided at both ends, in a frequency direction, in each subframe in the uplink. The radio resource included in the PUCCH region is allocated, as a PUCCH resource, to the UE 100. In the remaining portion of each subframe, a PUSCH region is provided. The radio resource included in the PUSCH region is allocated, as a PUSCH resource, to the UE 100.

One PUCCH resource uses each one resource block in two slots within a subframe. Furthermore, frequency hopping is applied between slots in a subframe, and a diversity effect is obtained between slots. A PUCCH resource is identified by a resource index m.

Furthermore, a plurality of formats (PUCCH formats) are supported, and in each PUCCH format, control signals of different types are sent as shown below. The number of bits of the control signal to be transmitted in one subframe differs depending on each PUCCH format.

PUCCH format 1; SR

PUCCH format 1a/1b: Ack/Nack

PUCCH format 2: CQI/PMI/RI

PUCCH format 2a/2b: CQI/PMI/RI and Ack/Nack

Further, in LTE-Advanced, a PUCCH format 3 is specified for sending a large number of Ack/Nack messages.

In the current specifications, the modulation scheme and the number of bits per subframe are defined as in the following Table 1.

TABLE 1

| PUCCH format | Modulation scheme | Number of bits per Subframe, Mbit |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

(Uplink Data Channel)

The PUSCH corresponds to an uplink data channel. In the PUSCH, Adaptive Modulation and channel Coding rate (AMC) that adaptively modifies a modulation and coding scheme (MCS) in accordance with an uplink channel state is used. It is noted that the AMC is a kind of link adaptations.

The eNB 200 measures an uplink channel state on the basis of an uplink reference signal received from the UE 100 (that is, performs a channel estimation), and performs scheduling in which the optimal PUSCH resource and MCS are decided. Then, the scheduling information (uplink SI), which is included into UL scheduling grant, is transmitted, on the PDCCH, to the UE 100.

Specifically, the eNB 200 holds a PUSCH-use MCS table in which an MCS and an MCS index are associated. The eNB 200 transmits an MCS index indicating an MCS decided on the basis of the uplink channel state, into the UL scheduling grant.

The UE 100 that receives the UL scheduling grant destined to the UE 100 recognizes, on the basis of the received UL scheduling grant, an allocated PUSCH resource and an MCS, and transmits user data by the allocated PUSCH resource and the MCS, on the PUSCH, to the eNB 200.

Specifically, the UE 100 holds a PUSCH-use MCS table similar to the PUSCH-use MCS table held by the eNB 200. The UE 100 transmits the user data, on the PUSCH, to the eNB 200, by the MCS indicated by the MCS index included in the UL scheduling grant.

(Operation According to Embodiment)

An operation according to the embodiment will be described, below.

In order to realize sophistication of the downlink transmission control (in particular, multi-antenna transmission control), more highly accurate CSI is needed; however in the current specifications, the number of bits of the CSI is fixedly set by the PUCCH format, as described above, and thus, it is not possible to feed back the more highly accurate CSI.

Therefore, in the embodiment, a mechanism of the AMC of the PUSCH is applied to the CSI so as to realize the highly accurate CSI feedback.

(1) Operation Sequence

FIG. 6 is an operation sequence chart about a CSI feedback according to the embodiment.

As shown in FIG. 6, in step S11, the eNB 200 measures the uplink channel state on the basis of an uplink reference signal received from the UE 100 (that is, performs a channel estimation).

In step S12, the eNB 200 performs scheduling in which the optimal PUSCH resource and MCS are decided, on the basis of the uplink channel state.

In step S13, the eNB 200 transmits the UL scheduling grant including the MCS index, on the PDCCH, to the UE 100. The UE 100-1 receives the UL scheduling grant destined to the UE 100-1. In the embodiment, the MCS index included in the UL scheduling grant corresponds to control information on the uplink channel state.

In step S14, the UE 100 designates a transmission scheme (feedback scheme) of the CSI, on the basis of the MCS index included in the UL scheduling grant and the CSI-use table held by the UE 100. Here, the transmission scheme of the CSI includes a CSI bit number (specifically, the number of bits of the CSI transmitted in each subframe). Further, the transmission scheme of the CSI further includes a modulation scheme applied to the CSI (demodulation order) and/or a coding scheme (coding rate). The CSI-use table is a table in which the MCS index and the transmission scheme of the CSI are associated. In the embodiment, the CSI-use table is a table different from the above-described PUSCH-use MCS table. The CSI-use table will be described in detail later.

In step S15, the eNB 200 designates and stores the transmission scheme of the CSI, on the basis of the MCS index included in the UL scheduling grant and the CSI-use table held by the eNB 200. The CSI-use table is a table in which the MCS index and the transmission scheme of the CSI are associated. In the embodiment, the CSI-use table is a table different from the above-described PUSCH-use MCS table. The CSI-use table will be described in detail later.

In step S16, the UE 100 transmits the CSI, on the PUCCH (or the PUSCH), to the eNB 200, by the transmission scheme of the CSI corresponding to the MCS index included in the UL scheduling grant. The eNB 200 receives the CSI.

In step S17, the eNB 200 demodulates and decodes the CSI received from the UE 100, on the basis of the transmission scheme (feedback scheme) of the CSI designated and stored in step S15. Then, the eNB 200 utilizes the demodulated and decoded CSI to the downlink transmission control (in particular, the multi-antenna transmission control).

(2) CSI-use Table

The UE 100 and the eNB 200 share, in addition to the PUSCH-use MCS table, the CSI-use table. Specifically, the UE 100 and the eNB 200 hold the PUSCH-use MCS table having the same content, and hold the CSI-use table having the same content.

FIG. 7 is a table for describing a configuration example 1 of the CSI-use table.

As shown in FIG. 7, the PUSCH-use MCS table is a table in which the modulation scheme and the coding scheme applied to the PUSCH are associated with the MCS index. In an example of FIG. 7, the MCS index "0" is associated with the modulation scheme "QPSK" and the coding scheme "channel coding 1"; the MCS index "1" is associated with the modulation scheme "16QAM" and the coding scheme "channel coding 2"; and the MCS index "2" is associated with the modulation scheme "64QAM" and the coding scheme "channel coding 3".

The CSI-use table is a table in which the modulation and coding scheme and the CSI bit number applied to the CSI are associated with the MCS index. In the example of FIG. 7, the MCS index "0" is associated with the modulation scheme "QPSK", the coding scheme "channel coding 1", and the CSI bit number "1". Further, the MCS index "1" is associated with the modulation scheme "16QAM", the coding scheme "channel coding 2", and the CSI bit number "2". Further, the MCS index "2" is associated with the modulation scheme "64QAM", the coding scheme "channel coding 3", and the CSI bit number "3". The channel coding 1', 2', 3', . . . may be obtained by utilizing the coding scheme defined in TS36.212.

It is noted that when the CSI is transmitted on the PUSCH, the CSI-use table, rather than the PUSCH-use MCS table, is applied to the CSI. Further, depending on whether the CSI is transmitted on the PUCCH or on the PUSCH and whether another information (the user data, the control signal) is multiplexed on the CSI, for example, the CSI-use table may be differed. Further, in the example of FIG. 7, the PUSCH-use MCS table and the CSI-use table are configured equally in modulation scheme; however, may be configured differently in modulation scheme.

FIG. 8 is a table for describing a configuration example 2 of the CSI-use table. The CSI-use table shown in FIG. 8 is different from the above-described configuration example 1 in that, on the presumption that the modulation scheme applied to the CSI is fixed, or is the same as the modulation scheme applied to the PUSCH, the coding scheme and the CSI bit number only are associated with each MCS index.

FIG. 9 is a table for describing a configuration example 3 of the CSI-use table. The CSI-use table shown in FIG. 9 is different from the above-described configuration example 1 in that, on the presumption that the modulation scheme and the coding scheme applied to the CSI are fixed, or are the same as the modulation scheme and the coding scheme applied to the PUSCH, the CSI bit number only is associated with each MCS index.

FIG. 10 is a table for describing a configuration example 4 of the CSI-use table. The CSI-use table shown in FIG. 10 is different from the above-described configuration example 1 in that a value of the CSI bit number is not directly specified, but the value of the CSI bit number is specified with an upper limit value.

Any one of the CSI-use tables according to the above-described configuration examples 1 to 4 is not used fixedly; the CSI-use table used may be switchable according to an instruction of the eNB 200.

(Summary of Embodiment)

In the embodiment, the eNB 200 transmits, as control information on an uplink channel state, an MCS index indicating a modulation and coding scheme (MCS) to be applied to a PUSCH, to the UE 100. The UE 100 receives the MCS index, and adaptively modifies the CSI bit number on the basis of the received MCS index. As a result, it is possible to feed back a highly accurate CSI, and thus, it is possible to realize sophistication of a downlink transmission control (in particular, a multi-antenna transmission control). For example, it may be also possible to feed back, as the CSI, each element in a downlink channel response matrix. Further, the MCS index is control information defined in the current specifications. Thus, when the CSI bit number is adaptively modified on the basis of the MCS index, it is possible to reduce overheads as compared to a case where special control information for adaptively modifying the CSI bit number is separately added.

Further, in the embodiment, the UE 100 adaptively modifies the CSI bit number on the basis of the MCS index, and adaptively modifies the modulation scheme and/or the coding scheme applied to the CSI. As a result, it is possible to code/demodulate the CSI with the coding scheme/the modulation scheme suitable for the uplink channel state.

[First Modification]

In the above-described embodiment, the UE 100 adaptively modifies the CSI bit number on the basis of the MCS index indicating the modulation and coding scheme (MCS) to be applied to the PUSCH. Here, the MCS index is control information defined in the current specifications.

On the other hand, in the first modification, new control information not defined in the current specification is introduced. Specifically, the eNB 200 transmits, on the basis of the uplink channel state, to the UE 100, control information (hereinafter, referred to as "CSI-use MCS index") indicating the modulation scheme and/or the coding scheme to be applied to the CSI transmitted on the PUCCH. The UE 100 adaptively modifies the CSI bit number, on the basis of the CSI-use MCS index.

Figure 11:
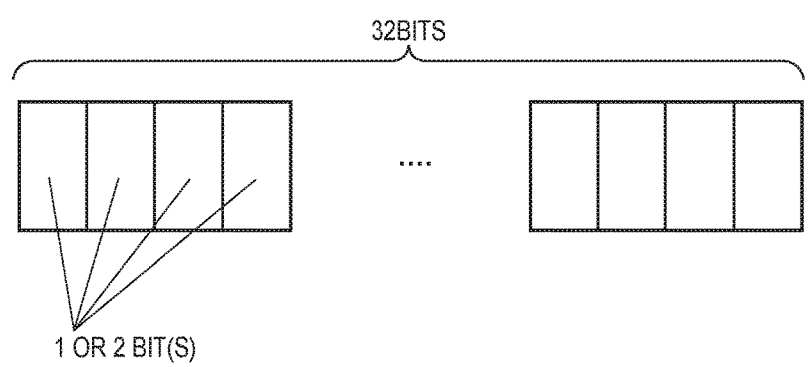
FIG. 11 is a diagram for describing control information according to a first modification of the embodiment.

FIG. 11 is a diagram for describing control information according to the first modification of the embodiment.

As shown in FIG. 11, in the first modification of the embodiment, a new DCI format is introduced which is for sending, on the PDCCH, the CSI-use MCS index indicating the modulation scheme and/or the coding scheme to be applied to the CSI transmitted on the PUCCH.

In an example of FIG. 11, the new DCI format is configured to transmit collectively CSI-use MCS indices for a plurality of UEs 100. Specifically, 32-bit DCI is sectioned in each one or two bits, and the each one or two bits is mapped with the CSI-use MCS index. A group including the plurality of UEs 100 is allocated with an RNTI for collectively transmitting the CSI-use MCS indices. The RNTI is a CSI-PUCCH-RNTI that is a group RNTI for transmitting CSI on the PUCCH, for example.

The eNB 200 transmits, to the group, one item of DCI including the CSI-use MCS indices for the plurality of UEs. Further, the eNB 200 notifies UEs 100 individually, by an RRC message, of the index indicating a location allocated to the UE 100 (order from the head) in the DCI.

When receiving the DCI, the UE 100 extracts, as a CSI-use MCS index destined to the UE 100, the CSI-use MCS index located at the allocated location indicated by the index. Then, the UE 100 adaptively modifies the CSI bit number (the modulation scheme and the coding scheme), on the basis of the CSI-use MCS index. It is noted that as the configuration of the table in which the CSI-use MCS index and the CSI bit number (the modulation scheme and the coding scheme) are associated, a configuration similar to that of the CSI-use table according to the above-described embodiment may be utilized.

[Second Modification]

In a second modification of the embodiment, a PUCCH format not defined in the current specification (hereinafter, referred to as "new PUCCH format") is introduced. Specifically, when the CSI is transmitted on the PUCCH, the eNB 200 transmits, on the basis of an uplink channel state, control information indicating the new PUCCH format to be applied to the PUCCH, to the UE 100. The control information (PUCCH format index), which is included in an RRC message, is transmitted. Alternatively, the new DCI format described in the above-described first modification of the embodiment may be utilized for transmission of the control information (PUCCH format index). Alternatively, it may be possible that a new field is provided in a PDSCH/PUSCH allocation-use DCI, and the control information (PUCCH format index), which is included in the field, is then transmitted on the PDCCH.

The new PUCCH format is a PUCCH format where it is possible to send a large CSI bit number as compared to PUCCH formats 2, 2a, or the like.

For example, the new PUCCH format is different from the PUCCH formats 2, 2a, or the like in modulation scheme and/or coding scheme to be applied.

Alternatively, the new PUCCH format is different from the PUCCH formats 2, 2a, or the like in cyclic shift number to be applied. In the PUCCH, an identical resource block is used to multiplex a code between users and a (code) resource per one user is designated with a parameter that is a cyclic shift. In the current PUCCH formats 2, 2a, or the like, one cyclic shift parameter is allocated per one user, and a different cyclic shift is used between different users to realize code multiplexing. On the other hand, in the new PUCCH format, two or more cyclic shifts are allocated to one user and a plurality of code resources are used so as to increase a bit amount to be transmitted (even when a modulation and coding scheme is not changed, a transmission bit number is increased by increasing the number of symbols to be transmitted).

[Other Embodiments]

In the above-described embodiment, a CSI bit number is adjusted on the basis of an MCS index included in UL scheduling grant (UL grant); however, when there is no PUSCH allocation, the UL scheduling grant is not notified to the UE 100, and thus, the following operation may be introduced.

The UE 100 saves the latest MCS index out of UL grants (past UL grants) received before. When there is no UL grant corresponding to the subframe in which a CSI feedback is performed, the UE 100 applies the saved latest MCS index to the CSI feedback.

The saved MCS index may have an expiration period. The expiration period indicates the number of subframes to be applied, for example, and the value may be broadcast (notified) from a base station and may be pre-defined (a value defined in the specification). Further, in order to monitor the expiration period of the saved MCS index, the UE 100 activates an expiration period timer when receiving a UL grant. This timer is reset when a UL grant is newly received.

In the above-described embodiment, a relation between a CSI bit number and a code book is not particularly described. However, the UE 100 and the eNB 200 may share a code book corresponding to each pattern of a CSI bit number. The code book is a table in which an index for identifying CSI (a CQI, a PMI, and an RI) is defined. For example, when the PMI, which is a kind of the CSI, is concerned, the code book of the PMI includes a plurality of precoder matrices, and respective indices (that is, the PMIs) of the plurality of precoder matrices. When the number of bits of the PMI is adaptively modified and when it is assumed that N patterns of "one bit", "two bits", "three bits" . . . "N bits" are defined as the number of bits of the PMI, the UE 100 and the eNB 200 share N PMI-use code book corresponding to the N patterns. The UE 100 and the eNB 200 selects the code book corresponding to the number of bits of the PMI, from among the N PMI-use code books, and on the basis of the selected code book, identifies the precoder matrix and its index (PMI).

However, in the above-described embodiment, instead of a code book-based feedback, it is possible to feed back, as the CSI, each element of a downlink channel response matrix. Thus, a new feedback mode according to the above-described embodiment is added to the code book-based feedback (Periodic, Aperiodic) in the current specification, and then, a CSI feedback may be performed by the feedback mode selected from among the feedback modes.

In the above-described embodiment, as an example of a mobile communication system, an LTE system is described; however, the present invention may be applied not only to the LTE system but also to a system other than the LTE system.

It is noted that the entire content of Japanese Patent Application No. 2013-249795 (filed on Dec. 3, 2013) is incorporated in the present specification by reference.

INDUSTRIAL APPLICABILITY

According to the present invention, it is possible to realize sophistication of a downlink transmission control.

The invention claimed is:

1. A user terminal comprising:
a controller configured to measure a state on a downlink channel;
a transmitter configured to transmit, to a base station, channel state information on the state, the channel state information being transmitted on an uplink control channel; and
a receiver configured to receive, from the base station, control information on an uplink channel state measured by the base station, wherein
the controller is configured to adaptively modify, on the basis of the control information, the number of bits of the channel state information,
the control information includes a modulation and coding scheme (MCS) index indicating an MCS to be applied to the channel state information transmitted on the uplink control channel, and
the MCS index has an expiration period indicating a number of subframes to be applied.

2. The user terminal according to claim 1, wherein the controller is configured to further adaptively modify, on the basis of the control information, a coding scheme applied to the channel state information.

3. The user terminal according to claim 1, wherein the controller is configured to further adaptively modify, on the basis of the control information, a modulation scheme applied to the channel state information.

4. The user terminal according to claim 1, wherein the control information includes information indicating a format to be applied to the uplink control channel.

5. A base station comprising:
a receiver configured to receive, from a user terminal, channel state information on a downlink channel state measured by the user terminal, the channel state information being transmitted on an uplink control channel;
a controller configured to measure a state on an uplink channel; and
a transmitter configured to transmit, to the user terminal, control information on the state, wherein the number of bits of the channel state information is adaptively modified according to the control information, the control information includes a modulation and coding scheme (MCS) index indicating an MCS to be applied to the channel state information transmitted on the uplink control channel, and the MCS index has an expiration period indicating a number of subframes to be applied.

6. The base station according to claim 5, wherein according to the control information, a coding scheme applied to the channel state information is adaptively modified.

7. The base station according to claim 5, wherein according to the control information, a modulation scheme applied to the channel state information is adaptively modified.

8. The base station according to claim 5, wherein the control information includes information indicating a format to be applied to the uplink control channel.

9. An apparatus to be provided in a user terminal, comprising:

a processor and a memory, the processor configured to perform the processing of:

measuring a state on a downlink channel;

receiving, from the base station, control information on an uplink channel state measured by the base station;

adaptively modifying the number of bits of channel state information on the state, on the basis of the control information, and transmitting, to the base station, the channel state information, the channel state information being transmitted on an uplink control channel, wherein the control information includes a modulation and coding scheme (MCS) index indicating an MCS to be applied to the channel state information transmitted on the uplink control channel, and the MCS index has an expiration period indicating a number of subframes to be applied.

* * * * *